(12) United States Patent
Yajima et al.

(10) Patent No.: US 12,152,528 B2
(45) Date of Patent: Nov. 26, 2024

(54) VALVE UNIT

(71) Applicant: NIPPON THERMOSTAT CO., LTD., Kiyose (JP)

(72) Inventors: Noriyasu Yajima, Kiyose (JP); Takatoshi Furuya, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 107 days.

(21) Appl. No.: 17/798,521

(22) PCT Filed: Dec. 23, 2020

(86) PCT No.: PCT/JP2020/048086
§ 371 (c)(1),
(2) Date: Aug. 9, 2022

(87) PCT Pub. No.: WO2021/161665
PCT Pub. Date: Aug. 19, 2021

(65) Prior Publication Data
US 2023/0129691 A1 Apr. 27, 2023

(30) Foreign Application Priority Data
Feb. 12, 2020 (JP) ................. 2020-021552

(51) Int. Cl.
*F01P 7/16* (2006.01)
*F01P 7/14* (2006.01)
(Continued)

(52) U.S. Cl.
CPC ............... *F01P 7/16* (2013.01); *F16K 11/24* (2013.01); *F16K 27/02* (2013.01); *F16K 31/002* (2013.01);
(Continued)

(58) Field of Classification Search
CPC .......... F01P 7/16; F01P 2007/146; F01P 3/02; F01P 2060/045; F01P 2060/08;
(Continued)

(56) References Cited

U.S. PATENT DOCUMENTS 6,053,417 A * 4/2000 Hotta .................... F25B 41/325
236/92 B

FOREIGN PATENT DOCUMENTS

EP 3382176 A1 10/2018
JP H01106919 A 4/1989
(Continued)

OTHER PUBLICATIONS

Machine Translation of JPH10317967A PDF File Name: "JPH10317967A_Machine_Translation.pdf".*
(Continued)

*Primary Examiner* — Grant Moubry
*Assistant Examiner* — Ruben Picon-Feliciano
(74) *Attorney, Agent, or Firm* — WHDA, LLP

(57) ABSTRACT

Provided is a downsizable valve unit. A valve unit 1 includes a valve case 4 including a valve case main body 4A where a thermo valve 2 is housed and a valve seat 4Aa which a valve body 2b unseats from and seats on is formed, and a sleeve 4B formed protruding outward from the valve case main body 4A; a sub-flow path R2 formed to include a cooling water storage chamber S formed inside the sleeve 4B, a lead-out passage 4Ae communicating the upstream side of the valve seat 4Aa in the valve case main body 4A with the cooling water storage chamber S, and a lead-in passage 4Af communicating the downstream side of the valve seat 4Aa in the valve case main body 4A with the cooling water storage chamber S; and a sub-valve 3 attached to a sleeve 4B to open and close a sub-flow path R2.

4 Claims, 6 Drawing Sheets

(51) Int. Cl.
*F16K 11/24* (2006.01)
*F16K 27/02* (2006.01)
*F16K 31/00* (2006.01)
*F16K 31/06* (2006.01)

(52) U.S. Cl.
CPC .... *F16K 31/0658* (2013.01); *F01P 2007/146* (2013.01)

(58) Field of Classification Search
CPC ...... F01P 2060/16; F16K 11/24; F16K 27/02; F16K 31/002; F16K 31/0658; F16K 31/001; F16K 1/44; F16K 31/06
See application file for complete search history.

(56) References Cited

FOREIGN PATENT DOCUMENTS

| JP | H10317967 A | * | 12/1998 | ........ F01P 2007/146 |
| JP | 2005-98153 A | | 4/2005 | |
| JP | 3859307 B2 | | 12/2006 | |

OTHER PUBLICATIONS

International Search Report dated Mar. 23, 2021, issued in counterpart International Application No. PCT/JP2020/048086. (2 pages).
Extended (Supplementary) European Search Report dated Feb. 16, 2024, issued in counterpart EP Application No. 20918766.5. (7 pages).

* cited by examiner

VALVE UNIT

TECHNICAL FIELD

The present invention relates to a valve unit, and more particularly to a valve unit provided in a passage through which cooling water of an internal combustion engine circulates.

BACKGROUND ART

The present applicant has previously proposed a control valve unit that controls cooling water of the internal combustion engine (Patent Literature 1). A control valve unit 50 will be described with reference to FIG. 6. The control valve unit 50 includes a housing 50A in which flanges 50a and 50b for connection are formed at both left and right end portions thereof. Further, the control valve unit 50 is connected to an intermediate portion of a cooling water passage connecting an engine (a water jacket) and a radiator, for example, via the flanges 50a and 50b.

The control valve unit 50 includes a thermostat-type control valve 51 that changes in shape depending on the temperature of the cooling water and controls the flow rate of the cooling water, and an electromagnetic control valve 52 that controls the flow rate of the cooling water by the operation of an electromagnetic actuator. The thermostat-type control valve 51 includes a frame 51a, a flange portion 51c attached to the frame 51a and supporting a thermo-sensitive element 51b as a temperature-sensitive actuator, a valve body 51d opened and closed by the thermo-sensitive element 51b, a spring 51e biasing the valve body 51d in a direction in which the valve is normally closed, and the like.

The thermo-sensitive element 51b further includes a piston 51h that moves forward and backward while being guided by a piston guide 51f and has a distal end engaged with a top portion of a support 51g formed in the flange portion 51c, and a temperature sensing unit 51j incorporating a wax 51i as a thermal expansion body that expands or contracts due to a temperature change of the cooling water to move the piston 51h forward and backward. In addition, the flange portion 51c is attached to the housing 50A constituting an outer shell of the control valve unit 50.

Further, when the cooling water flowing into the control valve unit 50 reaches a predetermined temperature or higher (for example, 80° C. or higher), the wax 51i incorporated in the temperature sensing unit 51j expands, and the piston 51h protrudes toward a top portion of the support 51g formed in the frame 51a. By a counter-reaction to the protrusion of the piston 51h, the valve body 51d is opened while resisting a biasing force of the spring 51e, and the cooling water is allowed to pass. In addition, a heat dissipation of the cooling water is promoted, and when the cooling water flowing into the control valve unit 50 reaches the predetermined temperature or lower (for example, 80° C. or lower), the wax 51i incorporated in the temperature sensing unit 51j contracts, the valve body 51d is closed by the biasing force of the spring 51e, and the passage of the cooling water is prevented.

On the other hand, the electromagnetic control valve 52 is formed in a central partition wall 50c in the housing 50A of the control valve unit 50, and includes a circular opening 50d that communicates an inlet side and an outlet side of the cooling water, and a poppet valve 52a that closes and opens the opening 50d. The poppet valve 52a is attached to one end portion of a rod 52b, and the rod 52b penetrates a side wall of the housing 50A and is held movable to reciprocate in an axial direction.

A cylindrical magnetic body 52c as a mover is fitted into the other end portion of the rod 52b outside the side wall of the housing 50A, and an electromagnetic coil 52d is disposed so as to surround the magnetic body 52c. Further, the electromagnetic coil 52d is attached to the housing 50A by a casing 52e attached to the side wall of the housing 50A. In addition, the magnetic body 52c and the electromagnetic coil 52d constitute the electromagnetic actuator.

Further, a coil-shaped expanding spring 52f arranged in the space portion between the cylindrical magnetic body 52c and the casing 52e biases the poppet valve 52a in the direction of closing the opening 50d. When a control current is supplied to the electromagnetic coil 52d, the electromagnetic control valve 52 opens and closes to control the flow rate of the cooling water.

As described above, because the control valve unit 50 includes the thermostat-type control valve 51 and the electromagnetic control valve 52, even when a failure occurs in one control valve, the other control valve exerts a fail-safe function capable of executing a cooling control.

CITATION LIST

Patent Literature

PTL 1: JP 3859307 B2

SUMMARY OF INVENTION

Technical Problem

In the thermostat-type control valve 51 described in PTL 1, a portion including the valve body 51d, the thermo-sensitive element 51b that drives the valve body 51d, and the spring 51e that biases the valve body 51d in the closing direction composes a thermo valve, and a portion that houses the thermo valve and includes a valve seat that the valve body 51d seats on and unseats from (in FIG. 6, a portion including such as the frame 51a, the support 51g) composes a valve case, and the valve case is further covered with the housing 50A to which an electromagnetic valve 52 is attached. In other words, in the valve unit including the thermostat-type control valve 51 and the electromagnetic control valve 52 described in PTL 1, there is a technical problem that the valve unit is increased in size because the portion that covers the thermo valve and becomes the valve case including the valve seat, which the valve body of the thermo valve seats on and unseats from, is formed in a double structure covered further with the housing 50A on which the electromagnetic control valve 52 is to be mounted.

Therefore, the present invention has been made in view of the above circumstances, and the object of the present invention is to provide a valve unit that can downsize the entire valve unit.

Solution to Problem

A valve unit according to the present invention for solving the above problem is a valve unit provided in a passage through which cooling water of an internal combustion engine circulates, and the valve unit includes a valve case that includes a valve case main body which houses a thermo valve therein and in which the main flow path is formed and has a valve seat which a valve body of the thermo valve seats on and unseats from formed in the middle of the main flow path, and a sleeve formed to protrude outward from the valve case main body; a sub-flow path that includes a cooling water storage chamber formed inside the sleeve, a lead-out passage communicating an upstream side of the valve seat of the main flow path with the cooling water storage chamber, and a lead-in passage communicating a downstream side of the valve seat of the main flow path with the cooling water storage chamber; and a sub-valve being attached to the sleeve to open and close the sub-flow path.

As described above, in the valve unit according to the present invention, the valve case housing the thermo valve includes the valve case main body including the valve seat which the valve body of the thermo valve seats on and unseats from and the sleeve formed to protrude outward from the valve case main body, the thermo valve is housed in the valve case main body, and the sub-valve is attached to the sleeve. Therefore, according to the above configuration, Downsizing of the valve unit is possible because the valve case accommodating the thermo valve can be prevented from being formed in a double structure in which the valve case, as in the conventional valve unit, is covered with the housing to which another valve (sub-valve) such as an electromagnetic control valve is attached.

The valve case main body and the sleeve may each have a cylindrical shape, and may be arranged such that an axis passing through a center of the valve case main body and an axis passing through a center of the sleeve intersect. In this way, pipelines constituting the passage through which the cooling water circulates can be connected to both ends of the valve case main body and are easily connectable.

Further, the valve seat may be disposed in a region opposing to an opening end portion of the sleeve on the valve case main body side in the axial direction of the valve case main body. In this way, the valve seat part serves as an open-and-close portion that is opened and closed by the thermo valve in the main flow path, and the cooling water storage chamber can be disposed at a position close to the opening and closing portion. Therefore, according to the above configuration, the valve unit can be further downsized because each of the lead-out passage communicating the upstream of the valve seat, serving as the open-and-close portion, with the cooling water storage chamber and the lead-in passage communicating the downstream of the valve seat with the cooling water storage chamber can be shortened.

Further, the thermo valve may include the valve body, a thermo-sensitive element that changes its shape depending on the temperature of the cooling water to drive the valve body, and a spring that biases the valve body to seat on the valve seat, and the valve case main body may include a first cylindrical portion in which the valve seat is formed and a second cylindrical portion joined to one end of the first cylindrical portion and provided with a spring seat supporting the spring.

In the valve unit thus configured, each component constituting the thermo valve may be housed in a state where the first cylindrical portion and the second cylindrical portion are separated, and then the thermo valve can be easily assembled into a valve case by integrally joining the first and second cylindrical portions. Further, by attaching the sub-valve to the sleeve from the outside of the sleeve, the sub-valve can be easily assembled into the valve case. Moreover, the lead-out passage may be connected to an outer periphery of the temperature sensing unit of the thermo valve in the valve case main body or to the downstream side of a portion where the temperature sensing unit is disposed.

With this, even when the thermo valve is closed, on opening the sub-valve, the cooling water on the upstream side of the thermo valve reaches the temperature sensing unit; as a result, the thermo valve can sense the temperature change of the cooling water on the upstream side. By changing the temperature at which the sub-valve is opened, the temperature at which the thermo valve is opened can be adjusted without changing the operating temperature of the thermo valve.

In addition, the sub-valve may include a coil, a plunger that reciprocates by energization to the coil, a valve body that is formed at the tip end portion of the plunger and opens and closes the inlet or the outlet, and a communication passage that communicates both sides of a moving direction of the plunger. As described above, when the sub-valve is an electromagnetic valve, the sub-valve can be electrically controlled. Further, in a case the communication passage communicating with both sides of the moving direction of the plunger is provided, it is possible to suppress the movement of the plunger from being hindered by a differential pressure generated in both sides of the moving direction of the plunger.

Advantageous Effects of Invention

According to the present invention, the valve unit can be downsized.

DESCRIPTION OF EMBODIMENTS

Hereinafter, a valve unit according to an embodiment of the present invention will be described with reference to FIGS. 1 to 5. The valve unit is a valve unit provided in a passage through which cooling water of an internal combustion engine circulates, and as illustrated in FIG. 2, for example, the valve unit is disposed in the middle of a passage 14 connecting a water jacket of the internal combustion engine and each device such as a heater core 10, an automatic transmission fluid (ATF) warmer 11, an exhaust gas recirculation (EGR) 12, and a throttle body 13, and is used to individually control the supply of the cooling water to each device. Further, as another application example, although not illustrated, the valve unit according to the present embodiment may be disposed in the passage to circulate the cooling water between the water jacket of the internal combustion engine and the radiator.

Valve Unit

Figure 1:
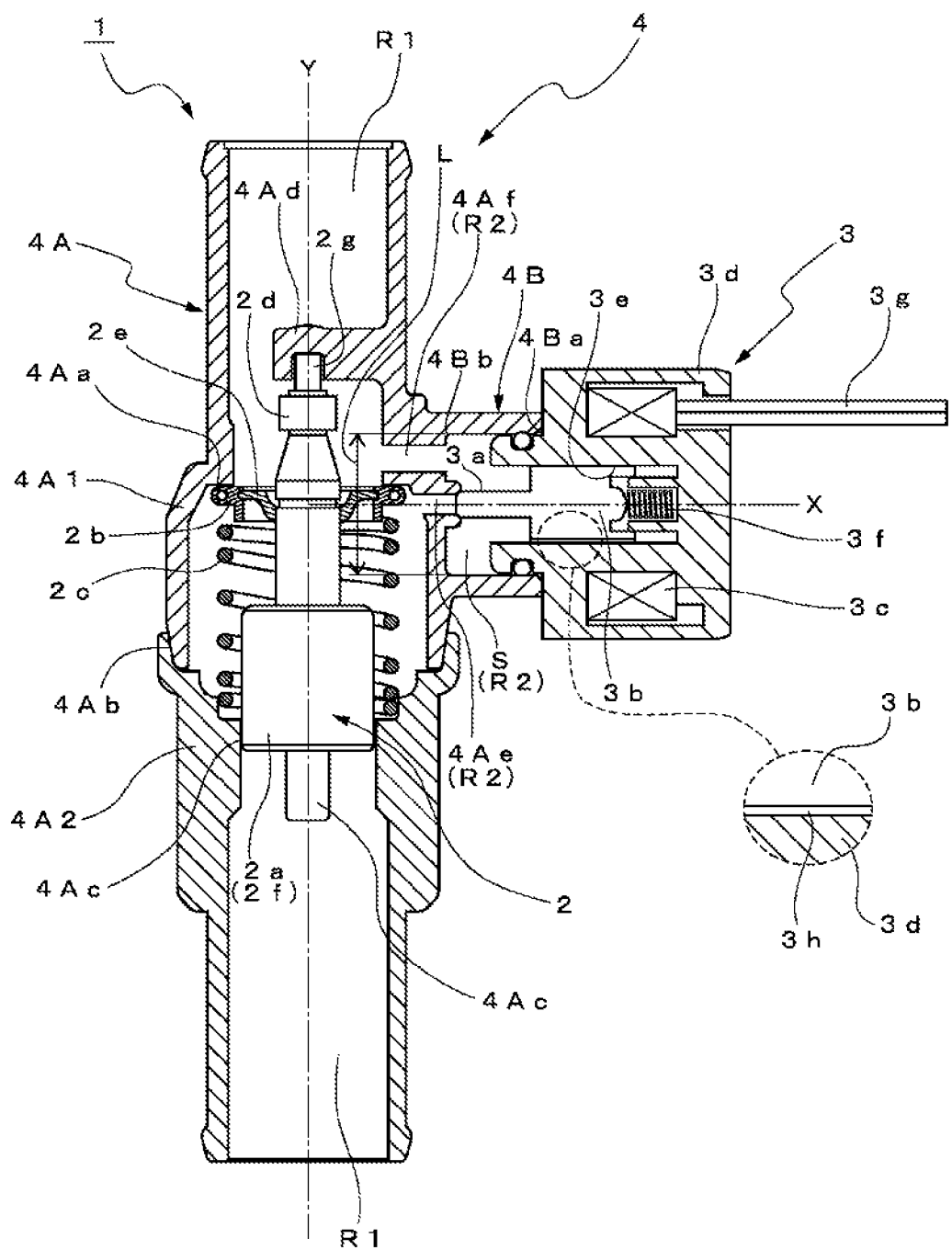
FIG. 1 is a cross-sectional view of a valve unit according to an embodiment of the present invention.
Figure 2:
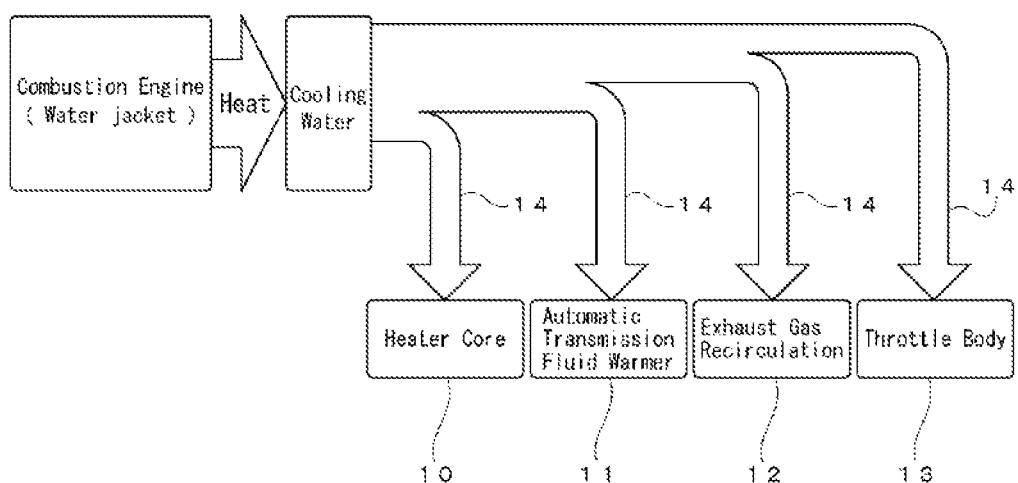
FIG. 2 is a conceptual diagram illustrating an application example of the valve unit.

As illustrated in FIG. 1, a valve unit 1 according to the present embodiment includes a valve case 4 in which a main flow path R1 is formed, a thermo valve 2 that is housed in the valve case 4 and opens and closes the main flow path R1 depending on the temperature of the cooling water, and a sub-valve 3 that is attached to a side portion of the valve case 4 and opens and closes a sub-flow path R2 bypassing the thermo valve 2. In the present embodiment, the sub-valve 3 is a solenoid valve, which has a solenoid as an electromagnetic actuator and opens and closes by actuation of the solenoid. The electromagnetic actuator may be a motor, and when the sub-valve is the electromagnetic valve that opens and closes by the electromagnetic actuator, the sub-valve can be electrically controlled, but the sub-valve may be a manually operated open-and-close valve.

The valve case 4 includes a valve case main body 4A and a sleeve 4B that is formed to protrude outward from the valve case main body 4A and in which a cooling water storage chamber S is formed. The valve case main body 4A is formed by joining a first cylindrical member 4A1 and a second cylindrical member 4A2 individually formed, and the sleeve 4B is integrally molded with the first cylindrical member 4A1.

Each of the first cylindrical member 4A1 and the second cylindrical member 4A2 is a straight tubular member made of synthetic resin. One end portion of the first cylindrical member 4A1 and one end portion of the second cylindrical member 4A2 are joined by laser welding (at a joint portion 4Ab), whereby the first cylindrical member 4A1 and the second cylindrical member 4A2 are integrated as the valve case main body 4A. Further, as described above, the first cylindrical member 4A1 and the sleeve 4B are integrally molded, whereby the valve case main body 4A and the sleeve 4B are integrated as the valve case 4. Note that the material and the joining method of the first cylindrical member 4A1 and the second cylindrical member 4A2 are not limited to those described above. For example, one end portion of the first cylindrical member 4A1 and one end portion of the second cylindrical member 4A2 may be joined by screwing. Further, the valve case main body 4A and the sleeve 4B may be formed separately and then joined, and a method of forming the valve case 4 can be appropriately changed. The other end portions of the first cylindrical member 4A1 and the second cylindrical member 4A2, which are to be both ends of the valve case main body 4A, are connected to other pipelines (not illustrated) constituting the passage 14 through which the cooling water circulates.

Further, the sleeve (branch pipe) 4B is formed so as to protrude outward from the side portion of the first cylindrical member 4A1 (outside in a radial direction of the first cylindrical member 4A1). In other words, assuming that a straight line passing through the centers of the first cylindrical member 4A1 and the second cylindrical member 4A2 (the valve case main body 4A) is an axis Y and a straight line passing through the center of the sleeve 4B is an axis X, the valve case main body 4A and the sleeve 4B are arranged such that the axes X and Y intersect. In this way, the pipeline constituting passage 14 through which the cooling water circulates can be connected to both ends of the valve case main body 4A and easily connected. The valve case main body 4A and the sleeve 4B may be arranged such that the axes X and Y obliquely intersect with each other, in addition to being arranged such that the axes X and Y are orthogonal to each other as illustrated in FIG. 1.

Further, the first cylindrical member 4A1 and the second cylindrical member 4A2 do not necessarily have a straight shape and may have, for example, an L shape or a U shape. Moreover, for example, when the first cylindrical member 4A1 has the L shape, the sleeve 4B may be disposed on the extension of the second cylindrical member 4A2 in an axial direction. As described above, the shape of the valve case main body 4A having the first cylindrical member 4A1 and the second cylindrical member 4A2 and the position of the sleeve 4B can be appropriately changed in accordance with the shape of the pipeline constituting the passage 14.

The main flow path R1 through which the cooling water flows is formed inside the valve case main body 4A composed of the first cylindrical member 4A1 and the second cylindrical member 4A2. On an inner periphery of the first cylindrical member 4A1, a piston receiving portion 4Ad that receives a piston 2g of the thermo valve 2 is formed to protrude from an inner wall of the first cylindrical member 4A1 but is configured not to block the main flow path R1. Further, an inner diameter of the first cylindrical member 4A1 is larger on a first end (the second cylindrical member 4A2 side) than on a second end, and the portion (a step) where the inner diameter varies is an annular valve seat 4Aa which a valve body 2b of the thermo valve 2 is seats on and unseats from. In other words, the valve seat 4Aa is positioned in the middle of the main flow path R1. Further, assuming that a direction along the axis Y passing through the center of the valve case main body 4A is the axial direction of the valve case main body 4A, the valve seat 4Aa is located in a region L facing an opening end portion 4Bb of the sleeve 4B on the valve case main body 4A side in the axial direction in the valve case main body 4A.

Ribs 4Ac are formed on the inner periphery of the second cylindrical member 4A2 to protrude from the inner wall of the second cylindrical member 4A2. The ribs 4Ac extend along the axial direction of the valve case main body 4A. Further, a plurality of ribs 4Ac are provided side by side in a circumferential direction of the second cylindrical member 4A2 (the valve case main body 4A). A first end of a spring 2c, whose second end is locked to the valve body 2b of the thermo valve 2, is supported on the end portion of the plurality of ribs 4Ac shown as an upper side in FIG. 1. In other words, the ribs 4Ac function as spring seats that support the first end of the spring 2c. In addition, a temperature sensing unit 2f, which will be described later, of the thermo valve 2 is inserted inside the plurality of ribs 4Ac arranged side by side in the circumferential direction so as to be movable in the axial direction, and these ribs 4Ac prevent (stop) the temperature sensing unit 2f from being shifted in the radial direction. In other words, the ribs 4Ac function not only as the spring seats as described above, but also as a guide of the temperature sensing unit 2f. Further, because gaps are formed along the axial direction between the ribs 4Ac adjacent to each other in the circumferential direction, the flow of the cooling water passing through the main flow path R1 is not hindered by the ribs 4Ac, even when the temperature sensing unit 2f is guided by the ribs 4Ac.

Further, the cooling water storage chamber S is formed inside the sleeve (branch pipe) 4B. Specifically, a casing 3d of the sub-valve 3 is attached to an opening end portion 4Ba of the sleeve (branch pipe) 4B on the side opposite to the valve case main body 4A (the opposite side to the valve case main body) via a seal member. As a result, the opening end portion 4Ba of the sleeve (branch pipe) 4B on the opposite side to the valve case main body is closed by the sub-valve 3, and the cooling water storage chamber S is formed in a portion surrounded by the sleeve 4B and the sub-valve 3. As described above, because the sub-valve 3 is attached to the opening end portion 4Ba of the sleeve 4B from the outside, the sub-valve 3 can be easily attached. Moreover, the opening end portion 4Ba of the sleeve 4B on an outside air side can be easily closed by attaching the sub-valve 3.

Further, the cooling water flows into the valve case 4 from a lower side (a first end) of the second cylindrical member 4A2 in FIG. 1 and flows out of the valve case 4 from the upper side (the second end) of the first cylindrical member 4A1 in FIG. 1, and a lead-out passage 4Ae that leads the cooling water in the main flow path R1 (in the first cylindrical member 4A1) to the cooling water storage chamber S is provided on the upstream side of the valve seat 4Aa in the flow direction of the cooling water. Further, on the downstream side of the valve seat 4Aa in a flow direction of the cooling water, a lead-in passage 4Af that leads the cooling water in the cooling water storage chamber S into the main flow path R1 (the first cylindrical member 4A1) is provided. Accordingly, even when the valve body 2b of the thermo valve 2 is seated on the valve seat 4Aa and the thermo valve 2 closes the main flow path R1, the cooling water can pass through the lead-out passage 4Ae, the cooling water storage chamber S, and the lead-in passage 4Af and pass through the valve case 4. In other words, the cooling water storage chamber S, the lead-out passage 4Ae, and the lead-in passage 4Af form the sub-flow path R2 bypassing the thermo valve 2.

Further, as described above, the valve seat 4Aa is located in the region L facing the opening end portion 4Bb of the sleeve 4B on the valve case main body 4A side in the axial direction in the valve case main body 4A. Here, when the sub-flow path R2 bypassing the thermo valve 2 that opens and closes the main flow path R1 is formed, the upstream side and the downstream side of the valve seat 4Aa serving as the opening and closing portion opened and closed by the thermo valve 2 in the main flow path R1 may be communicated with each other by the sub-flow path R2. Moreover, because the open-and-close portion of the thermo valve 2 and the cooling water storage chamber S are disposed close to each other when the valve seat 4Aa is disposed as described above, the length of the lead-out passage 4Ae that communicates the upstream side of the open-and-close portion with the cooling water storage chamber S and the length of the lead-in passage 4Af that communicates the downstream side of the open-and-close portion with the cooling water storage chamber S can be shortened, and the valve case 4 can be downsized, leading to a downsize in the valve unit 1. In addition, the lead-out passage 4Ae is connected to the downstream side of the portion of the thermo valve 2 in the valve case main body 4A where the temperature sensing unit 2f is disposed. Accordingly, even with the thermo valve 2 closed, when the sub-valve 3 opens the sub-flow path R2, the cooling water on the upstream side of the thermo valve 2 reaches the temperature sensing unit 2f.

In addition, in FIG. 1, the sub-valve 3 opens and closes a connection portion between the lead-out passage 4Ae and the cooling water storage chamber S in the sub-flow path R2, but the sub-valve 3 may open and close the lead-in passage 4Af, or any part of the sub-flow path R2 may be opened and closed by the sub-valve 3.

Thermo Valve

As the thermo valve 2, a generally used thermo valve can be employed. For example, as illustrated in FIG. 1, the thermo valve 2 includes a thermo-sensitive element 2a as a temperature-sensitive actuator that changes its shape depending on the temperature of the cooling water to drive the valve body 2b, the valve body 2b that is driven by the thermo-sensitive element 2a to seat on and unseat from the valve seat 4Aa and open and close the main flow path R1, and the spring 2c that biases the valve body 2b in a direction in which the valve is normally closed (a direction in which the valve body 2b is seated on the valve seat 4Aa). The thermo-sensitive element 2a includes a piston guide 2d, the piston 2g that moves forward and backward while being guided by the piston guide 2d and has a distal end engaged with the piston receiver 4Ad, and the temperature sensing unit 2f incorporating the wax as a thermal expansion body that expands or contracts due to the temperature change of the cooling water to move the piston 2g forward and backward.

The valve body 2b is attached to the piston guide 2d via a frame 2e, and a case of the temperature sensing unit 2f is attached to the piston guide 2d. Accordingly, the piston guide 2d, the valve body 2b, and the temperature sensing unit 2f integrally move in the axial direction with respect to the piston 2g. Further, as described above, one end of the spring 2c is supported by the valve body 2b, and the other end of the spring 2c is supported by an upper end surface of the ribs 4Ac of the second cylindrical portion 4A2. Though the spring 2c may be any type of spring, the spring is a coil spring in the present embodiment, and is interposed in a compressed state between the valve body 2b and the ribs (the spring seats) 4Ac. Therefore, the valve body 2b is biased by the spring 2c in a direction in which the valve is normally closed (a direction in which the valve body 2b is seated on the valve seat 4Aa).

In the thermo valve 2 configured as described above, when the temperature of the cooling water flowing into the valve unit 1 rises to a predetermined value or higher, the wax in the temperature sensing unit 2f expands to push out the piston 2g and the thermo-sensitive element 2a extends. At this time, because the upper end of the piston 2g is in contact with the piston receiving portion 4Ad, when the piston 2g is pushed out, the piston guide 2d, the temperature sensing unit 2f, and the valve body 2b move downward in FIG. 1 against a biasing force of the spring 2c. As a result, the valve body 2b unseats from the valve seat 4Aa to open the main flow path R1, and the cooling water passes between the valve body 2b and the valve seat 4Aa.

In addition, when a heat dissipation of the cooling water is promoted, the temperature of the cooling water flowing into the valve unit 1 falls below the predetermined value and the temperature sensing unit 2f is cooled by the cooling water, and when the wax in the temperature sensing unit 2f contracts, the piston 2g retracts and the thermo-sensitive element 2a contracts. At this time, because the upper end of the piston 2g is in contact with the piston receiving portion 4Ad and the valve body 2b is biased toward the valve seat 4Aa side by the spring 2c, when the piston 2g enters, the piston guide 2d, the temperature sensing unit 2f, and the valve body 2b move upward in FIG. 1 due to the biasing force of the spring 2c. Accordingly, the valve body 2b seats on the valve seat 4Aa to close the main flow path R1.

Sub-Valve

As the sub-valve 3, a generally used solenoid valve can be employed. For example, the sub-valve 3 includes a plunger 3b as a mover where a valve body 3a that opens and closes the lead-out passage 4Ae is formed at the tip end portion, and a coil 3c disposed so as to surround the plunger 3b; and the plunger 3b and the coil 3c constitute the electromagnetic actuator. A power supply line 3g that supplies a control current to the coil 3c is connected to the sub-valve 3. Further, the coil 3c is housed in the casing 3d. The casing 3d is provided with a guide hole 3e into which the plunger 3b is inserted as slidable freely.

A biasing spring 3f is disposed in a space between the plunger 3b and the bottom of the guide hole 3e. The plunger 3b (the valve body 3a) is biased in a direction of closing the lead-out passage 4Ae by the biasing spring 3f. Further, when the coil 3c is excited by an energization, the plunger 3b (the valve body 3a) is attracted in a direction of opening the lead-out passage 4Ae against the biasing force of the biasing spring 3f. While, at the time of non-energization, the plunger 3b receives the biasing force of the biasing spring 3f to close the lead-out passage 4Ae. As described above, the sub-valve 3 of the present embodiment is a normally-closed solenoid valve.

Further, a groove is formed along the axial direction on an outer periphery of the plunger 3b, and the groove forms a communication passage 3h between the plunger 3b and the casing 3d that communicates both sides of plunger 3b moving direction. With this, when the plunger 3b reciprocates, the space formed between the plunger 3b and the bottom portion of the casing 3d expands or contracts. However, because the communication passage prevents hindering plunger movement due to the confinement of cooling water in the space, the operation guarantee of plunger 3b is possible. In addition, in FIG. 1, the communication passage 3h that communicates with both sides of the plunger 3b moving direction is composed of the groove formed in the outer periphery of the plunger 3b, but the method of forming the communication passage 3h is not limited thereto. For example, the communication passage 3h may be composed of the groove formed in a peripheral wall of the guide hole 3e into which the plunger 3b is inserted or a through-hole penetrating the plunger 3b in the axial direction (the moving direction of the plunger 3b).

In the sub-valve 3 configured as described above, the valve body 3a at the tip end portion of the plunger 3b closes the lead-out passage 4Ae at the time of non-energization, and opens the lead-out passage 4Ae when receiving the supply of the control current. Accordingly, even when the thermo valve 2 closes the main flow path R1, the cooling water passes through the sub-flow path R2 and flows from the inside to the outside of the valve case 4. Further, because the sub-valve 3 is provided in the sub-flow path R2 through which the cooling water flows, when the sub-valve 3, which is the solenoid valve, generates heat by energization, the cooling water promotes the heat dissipation of the sub-valve 3 (the solenoid valve). Additionally, in the present embodiment, the sub-valve 3 is the normally-closed solenoid valve, but may be a normally-open type that closes the sub-flow path R2 during the energization.

Assembly of Valve Unit

An example of a method for assembling the valve unit 1 according to the present embodiment will be described below. First, the thermo valve 2 is housed in the first cylindrical member 4A1. Specifically, the thermo valve 2 is housed from the first end side of the first cylindrical member 4A1 separated from the second cylindrical member 4A2. At this time, the piston 2g is engaged with the piston receiving portion 4Ad, and the valve body 2b is in contact with the valve seat 4Aa. Further, the spring 2c is housed so as to be in contact with a back surface of the valve body 2b, and then the second cylindrical member 4A2 is fitted to the first cylindrical member 4A1, and both are joined by the laser welding. Accordingly, the housing of the thermo valve 2 into the valve case 4 is completed.

Subsequently, the sub-valve 3 is attached to the sleeve 4B of the valve case 4. Specifically, the casing 3d of the sub-valve 3 is attached to the opening end portion 4Ba from the outside of the sleeve (branch pipe) 4B via the seal member. Additionally, although not illustrated, the casing 3d of the sub-valve 3 is provided with a flange, and the flange is fixed by bolting (screwing) the flange to the sleeve 4B.

As described above, in the valve unit 1, the thermo valve 2 is disposed in the valve case main body 4A including the first cylindrical member 4A1, and the sub-valve 3 is attached to the sleeve 4B protruding outward from the valve case main body 4A. Therefore, the valve unit can be downsized as compared with the conventional valve unit in which the valve case housing the thermo valve is further covered with the housing for attaching the sub-valve. Further, according to the method for assembling the valve unit 1 described above, the valve unit 1 can be easily assembled because the thermo valve 2 is easily assembled in the valve case 4 and the sub-valve 3 is easily assembled to the sleeve 4B from the outside of the sleeve 4B.

Operation and Action of Valve Unit

In the thermo valve 2, when an ambient temperature of the temperature sensing unit 2f becomes equal to or higher than the predetermined temperature, the thermo-sensitive element 2a extends to open the main flow path R1. When the minimum temperature required for the thermo valve 2 to open the main flow path R1 due to the shape change of the thermo-sensitive element 2a is defined as the predetermined operating temperature, the operating temperature of the thermo valve 2 is uniquely determined by adjusting the wax housed in the temperature sensing unit 2f. On the other hand, when the temperature at which the thermo valve 2 is desired to be opened is set to a predetermined valve opening temperature, according to the valve unit 1 of the present embodiment, the thermo valve 2 can be opened at the predetermined valve opening temperature without changing the operating temperature of the thermo valve 2, as long as the predetermined valve opening temperature is equal to or higher than the operating temperature. Specifically, for example, even when the operating temperature of the thermo valve 2 is 50° C., the thermo valve 2 can be opened at any predetermined temperature equal to or higher than the operating temperature such as 80° C.

As illustrated in FIG. 1, initially, the temperature of the cooling water in the entire system illustrated in FIG. 2 is equal to or lower than the operating temperature of the thermo valve 2 (for example, 50° C.), and in a state where both the thermo valve 2 and the sub-valve 3 of the valve unit 1 are closed, the cooling water in the valve case 4 (around the temperature sensing unit 2f) is retained without flowing.

As described above, in a state where the thermo valve 2 and the sub-valve 3 are closed and the cooling water in the valve case 4 is retained, even when the water temperature of the cooling water on the upstream side (the internal combustion engine side) of the valve unit 1 rises to the operating temperature (for example, 50° C.) or higher, the cooling water with an increased temperature does not reach the temperature sensing unit 2f of the thermo valve 2. As a result, the wax incorporated in the temperature sensing unit 2f is not warmed, and the valve opening operation of the thermo valve 2 is not performed.

Figure 3:
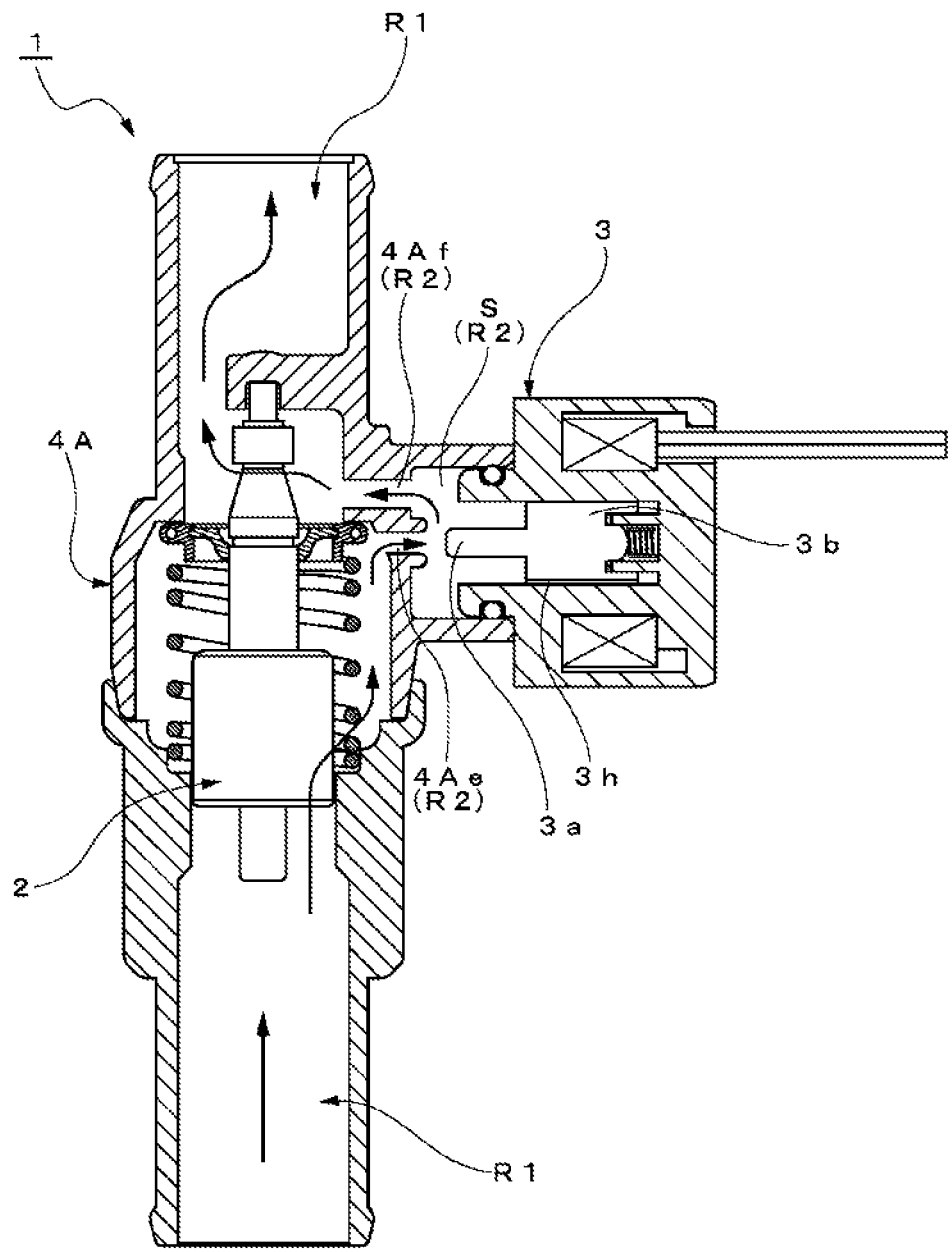
FIG. 3 is a cross-sectional view illustrating an operation state of the valve unit (sub-valve: open, thermo valve: closed) according to the embodiment of the present invention.

While, when the water temperature of the cooling water on the upstream side of the valve unit 1 reaches the predetermined valve opening temperature, for example, 80° C., the control current is supplied to the sub-valve 3 of the valve unit 1 to open the sub-valve 3. Specifically, as illustrated in FIG. 3, when the coil 3c is excited by receiving the supply of the control current, the plunger 3b is pulled rightward in FIG. 3, and the valve body 3a of the plunger 3b opens the lead-out passage 4Ae. Subsequently, as indicated by solid arrows, the cooling water flows through the sub-flow path R2 even when the thermo valve 2 closes the main flow path R1. In other words, the cooling water is led into the cooling water storage chamber S through the lead-out passage 4Ae, and is returned from the cooling water storage chamber S into the first cylindrical member 4A1 through the lead-in passage 4Af.

Figure 4:
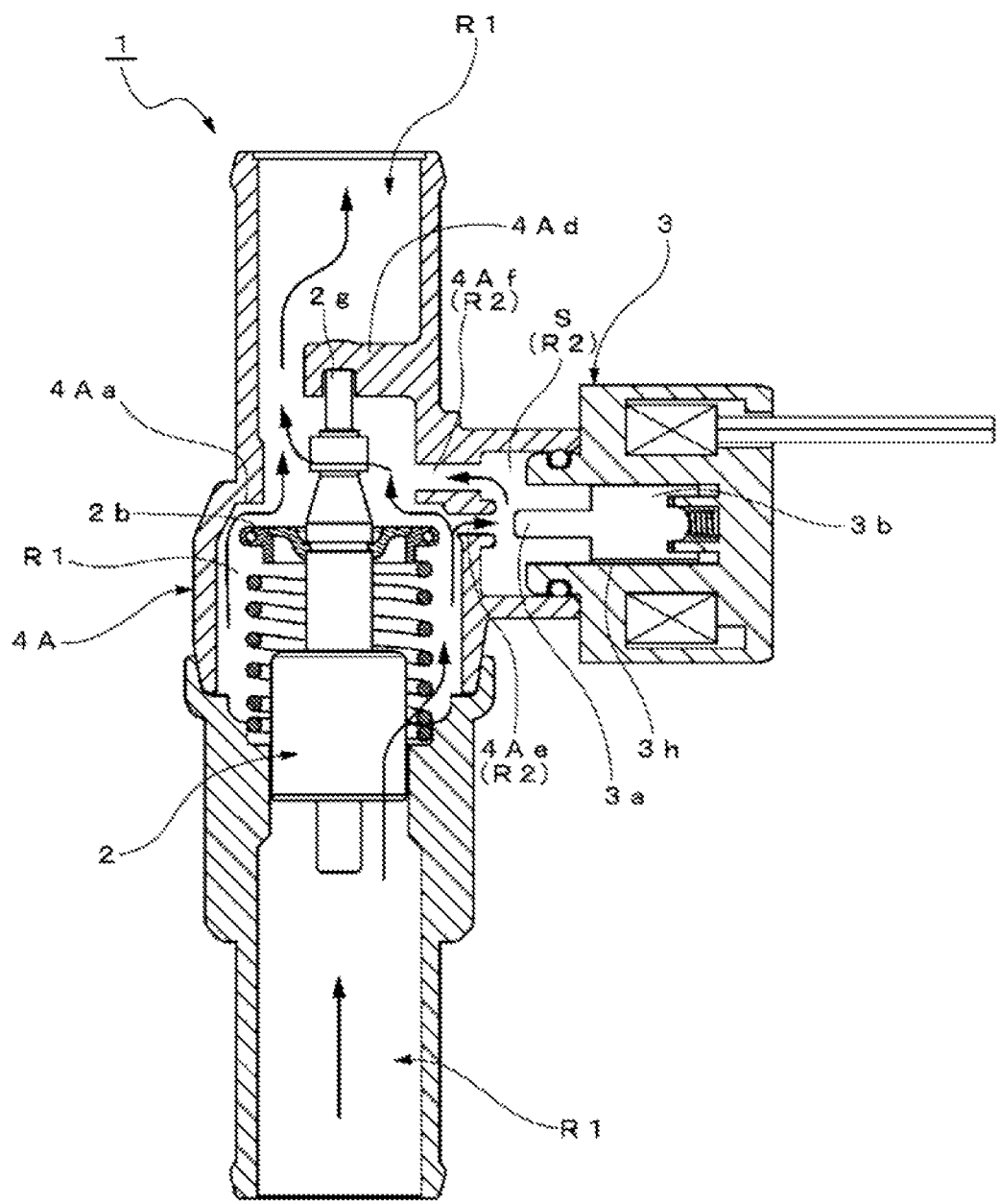
FIG. 4 is a cross-sectional view illustrating an operation state of the valve unit (sub-valve: open, thermo valve: open) according to the embodiment of the present invention.

As described above, when the sub-valve 3 opens the sub-flow path R2, the flow of the cooling water is generated in the valve case 4, and the cooling water with the increased temperature reaches the temperature sensing unit 2f. In addition, because the operating temperature of the thermo valve 2 (for example, 50° C.) is set to be lower than the predetermined valve opening temperature (for example, 80° C.), as illustrated in FIG. 4, the thermo valve 2 is quickly opened, and the cooling water flows through the main flow path R1. When it is desired to set the predetermined valve opening temperature for opening the thermo valve 2 to a temperature other than 80° C., for example 90° C., the control current may be supplied to the sub-valve 3 when the temperature of the cooling water on the upstream side of the valve unit 1 becomes 90° C.

As described above, when the predetermined valve opening temperature that opens the thermo valve 2 is equal to or higher than the operating temperature of the thermo valve 2, the valve opening operation of the thermo valve 2 can be controlled by the open-and-close control of the sub-valve 3 without adjusting the operating temperature of the thermo valve 2 itself by adjusting the wax. In other words, according to the valve unit 1 of the present embodiment, even when the operating temperature of the thermo valve 2 is constant, the valve opening temperature of the thermo valve 2 can be freely set at any predetermined temperature equal to or higher than the operating temperature. Accordingly, even when different temperatures are desired for opening the passages 14 leading to the devices such as the heater core 10, the automatic transmission fluid (ATF) warmer 11, the exhaust gas recirculation (EGR) 12, and the throttle body 13, it is not necessary to individually prepare the thermo valves 2 having different operating temperatures. Furthermore, the temperature at which each of the 14 passages opens can be easily changed by using the valve unit 1, thereby making it easier to adjust the entire cooling system.

Moreover, as described above, for the thermo valve 2 to sense the temperature, the cooling water should flow in the valve case 4. Therefore, if only the thermo valve 2 is installed in the passage 14, even if the thermo valve 2 is closed, a slight flow of cooling water is required to sense the temperature. However, according to valve unit 1 of the present embodiment, the sub-valve 3 is only to be opened when desired to make the thermo valve 2 sense the temperature; thus, this reduces waste of cooling water and enables efficient use of cooling water heat.

Figure 5:
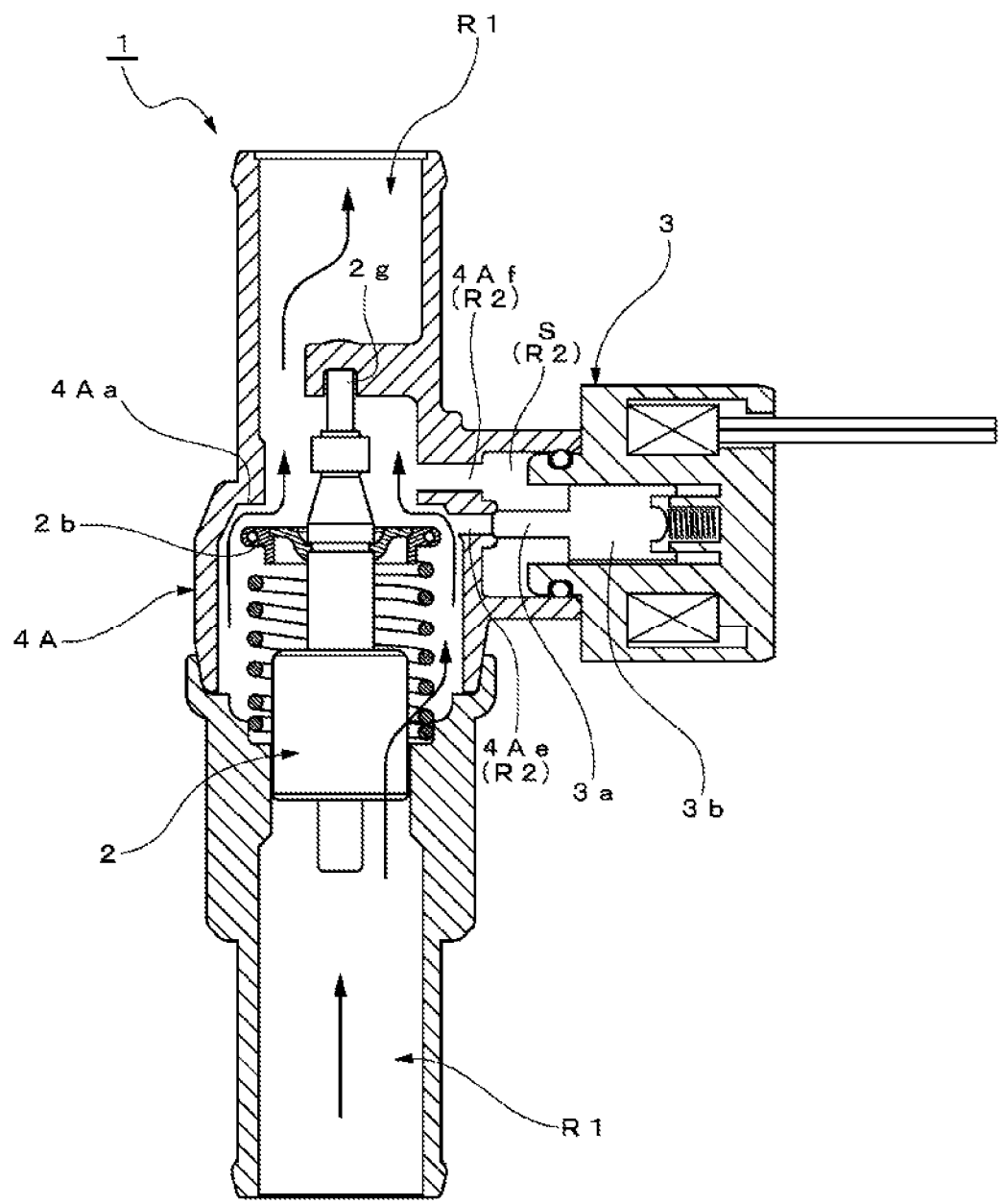
FIG. 5 is a cross-sectional view illustrating an operation state of the valve unit (sub-valve: closed, thermo valve: open) according to the embodiment of the present invention.
Figure 6:
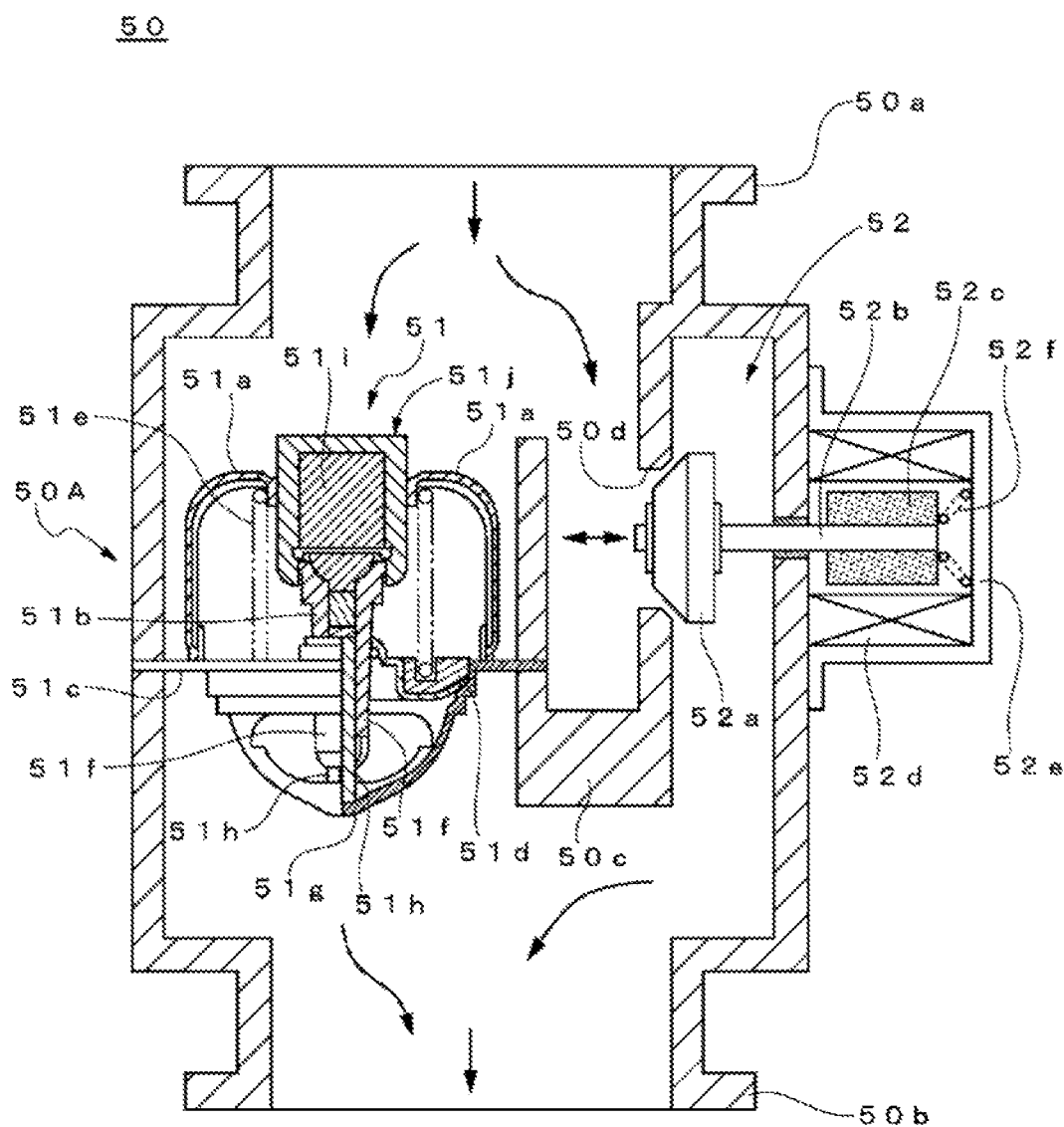
FIG. 6 is a cross-sectional view of a conventional control valve unit.

Further, because the thermo valve 2 can sense the temperature when the flow of the cooling water is generated in the valve case 4, the lead-out passage 4Ae may be closed by cutting the energization to the sub-valve 3 in response to the open state of the thermo valve 2, as illustrated in FIG. 5, as long as the flow rate of the coolant passing through the thermo valve 2 is sufficient. In this way, power can be saved, and a heat generation of the solenoid can be suppressed. In addition, because the flow rate of the cooling water passing through the sub-valve 3 is only to be sufficient to make the thermo valve 2 sense the temperature and is very small as compared with the flow rate of the cooling water passing through the thermo valve 2, the sub-valve 3 can be downsized, leading to the further downsizing of the valve unit 1. Moreover, the thermo valve 2 closes and returns to the state illustrated in FIG. 1 when the temperature of the cooling water in the valve case 4 drops below the operating temperature (for example, 50° C.) regardless of whether the sub-valve 3 is open or closed.

In summary, because the operating temperature of the thermo valve 2 is uniquely determined by adjusting the wax as described above, adjusting the wax is necessary to change the operating temperature. Accordingly, in using the thermo valve 2 alone, adjusting the wax for each desired valve opening temperature is necessary so that the operating temperature might be the desired valve opening temperature. However, in the valve unit 1 of the present embodiment which uses a combination of the thermo valve 2 and the sub-valve 3, if the temperature of the cooling water on the upstream side of the valve unit 1 is equal to or higher than the operating temperature of the thermo valve 2, the thermo valve 2 can be opened at the open operation timing of the sub-valve 3. Therefore, the thermo valve 2 can be opened at any different predetermined temperature, even when thermo valves with the same operating temperature are used, by changing the temperature at which the sub-valve 3 is opened as long as the temperature thereof is equal to or higher than the operating temperature. In other words, the valve opening temperature of the thermo valve 2 can be set to any predetermined temperature equal to or higher than the operating temperature of the thermo valve 2. In addition, the responsiveness of the valve opening of the thermo valve 2 can be enhanced by providing a temperature difference between the operating temperature and the valve opening temperature of the thermo valve 2. In contrast, the thermo valve 2 is closed when the temperature of the cooling water lowers than the operating temperature. Accordingly, in the valve unit 1, although the thermo valve 2 is used, the opening and closing are performed at different temperatures from the operating temperature of the thermo valve 2.

In the above embodiment, the temperature on the upstream side of the valve unit 1 is detected by a temperature sensor, and a controller mounted on a vehicle body controls a supply current to the sub-valve 3 of the valve unit 1 based on the detection information by the temperature sensor. However, the supply current to the sub-valve 3 may be controlled by opening degree information of a throttle valve and rotational speed information of the internal combustion engine. Further, in the above embodiment, the lead-out passage 4Ae is connected on the downstream side of the temperature sensing unit 2f of the thermo valve 2 in the valve case main body 4A, but the lead-out portion 4Ae may be connected to the outer periphery part of the temperature sensing unit 2f. The thermo valve 2 can be opened at any predetermined temperature equal to or higher than the operating temperature of the thermo valve 2, as long as the cooling water passes through the temperature sensing unit 2f when the sub-valve 3 is opened.

LIST OF REFERENCE SIGNS

1 Valve unit
2 Thermo valve
2a Thermo-sensitive element
2b Valve body
2c Spring
2d Piston guide
2e Frame 2f Temperature sensing unit
2g Piston
3 Sub-valve
3a Valve body
3b Plunger
3c Coil
3d Casing
3f Biasing spring
3h Communication passage
4 Valve case
4A Valve case main body
4A1 First cylindrical portion
4A2 Second cylindrical portion
4Aa Valve seat
4Ac Rib (spring seat)
4Ae Lead-out passage
4Ad Piston receiving portion
4Af Lead-in passage
4B Sleeve (branch pipe)
4Bb Opening end portion on the valve case main body side
4Bc Opening end portion on the opposite side to the valve case main body (side opposite to the valve case main body)
R1 Main flow path
R2 Sub-flow path
S Cooling water storage chamber

The invention claimed is:

1. A valve unit provided in a passage through which cooling water of an internal combustion engine circulates, the valve unit comprising:
a thermo valve that opens and closes a main flow path depending on a temperature of the cooling water;
a valve case including:
a valve case main body in which the thermo valve is housed therein, and the main flow path is formed, and in which a valve seat which a valve body of the thermo valve seats on and unseats from is formed in the middle of the main flow path, and
a sleeve formed to protrude outward from the valve case main body;
a sub-flow path formed to include a cooling water storage chamber formed inside the sleeve, a lead-out passage communicating an upstream side of the valve seat of the main flow path with the cooling water storage chamber, and a lead-in passage communicating a main flow path on a downstream side of the valve seat of the main flow path with the cooling water storage chamber; and
a sub-valve attached to the sleeve to open and close the sub-flow path,
wherein the valve case main body and the sleeve each have a cylindrical shape, and are arranged such that an axis passing through a center of the valve case main body and an axis passing through a center of the sleeve intersect, the sleeve protrudes outward from the valve case main body in a radial direction of the cylindrical shape of the valve case main body, and
the valve seat is disposed in a region facing an opening end portion of the sleeve on the valve case main body side in an axial direction of the valve case main body.

2. The valve unit according to claim 1, wherein
the thermo valve includes
the valve body,
a thermo-sensitive element that includes a temperature sensing unit and changes in shape depending on a temperature of the cooling water to drive the valve body, and
a spring that biases the valve body to seat on the valve seat, and
the valve case main body includes
a first cylindrical portion in which the valve seat is formed, and
a second cylindrical portion joined to one end of the first cylindrical portion and provided with a spring seat that supports the spring.

3. The valve unit according to claim 2, wherein
the lead-out passage is connected to an outer periphery of the temperature sensing unit in the valve case main body or to the downstream side of a portion where the temperature sensing unit is disposed.

4. The valve unit according to claim 1, wherein
the sub-valve includes
a coil,
a plunger that reciprocates by an energization to the coil,
a valve body formed at a tip end of the plunger to open and close the lead-in passage or the lead-out passage, and
a communication passage communicating with both sides of the plunger moving direction.

\* \* \* \* \*